(12) United States Patent
Earl et al.

(10) Patent No.: US 9,066,192 B2
(45) Date of Patent: Jun. 23, 2015

(54) METHOD AND SYSTEM FOR DELIVERING DEVICE SPECIFIC SERVICE DOCUMENTATION TO A MOBILE PLATFORM

(75) Inventors: Jeffrey R. Earl, Pittsford, NY (US); Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 461 days.

(21) Appl. No.: 13/290,575

(22) Filed: Nov. 7, 2011

(65) Prior Publication Data

US 2013/0115923 A1    May 9, 2013

(51) Int. Cl.
*H04M 3/42* (2006.01)
*H04W 4/00* (2009.01)
*H04W 4/02* (2009.01)

(52) U.S. Cl.
CPC ............... *H04W 4/001* (2013.01); *H04W 4/02* (2013.01)

(58) Field of Classification Search
CPC ..... H04W 16/18; H04W 24/00; H04W 24/02; H04W 8/18; H04W 8/20; G02B 2027/014; G02B 2027/0138; G06F 3/005
USPC .................................... 455/414.1, 414.3, 423
See application file for complete search history.

(56) References Cited

U.S. PATENT DOCUMENTS

| 6,665,085 B1 | 12/2003 | Edmunds et al. |
| 7,692,809 B2 | 4/2010 | McQuillan |
| 8,170,545 B1 * | 5/2012 | Freeburne ..................... 455/423 |
| 2003/0110412 A1 | 6/2003 | Neville |
| 2004/0199617 A1 * | 10/2004 | Garrett et al. ................. 709/223 |
| 2006/0136104 A1 * | 6/2006 | Brozovich et al. .............. 701/29 |
| 2007/0097419 A1 * | 5/2007 | Mathewson ................. 358/1.15 |
| 2008/0026743 A1 * | 1/2008 | Kaplan .......................... 455/425 |
| 2011/0185220 A1 | 7/2011 | Foley et al. |

OTHER PUBLICATIONS

U.S. Appl. No. 12/844,586, filed Jul. 27, 2010, Jason Tsongas et al.
U.S. Appl. No. 13/010,896, filed Jan. 21, 2011, Roulland et al.

* cited by examiner

*Primary Examiner* — Khalid Shaheed
*Assistant Examiner* — Shantell L Heiber
(74) *Attorney, Agent, or Firm* — Fay Sharpe LLP (57) ABSTRACT

Disclosed is a method and system for delivering device specific service information to a mobile platform. According to an exemplary system, a mobile phone and a Device Assist Server are operatively connected to prompt a user to capture relevant device information using a camera associated with the mobile phone. A remote Device Assist Server processes this device information and provides service related information to the user via the mobile phone.

22 Claims, 4 Drawing Sheets

METHOD AND SYSTEM FOR DELIVERING DEVICE SPECIFIC SERVICE DOCUMENTATION TO A MOBILE PLATFORM

CROSS REFERENCE TO RELATED PATENTS AND APPLICATIONS

U.S. patent application Ser. No. 12/844,586, filed Jul. 27, 2010, by Jason Tsongas et al., entitled "AUGMENTED REALITY SYSTEM AND METHOD FOR DEVICE MANAGEMENT AND SERVICE"; and, U.S. patent application Ser. No. 13/010,896, filed Jan. 21, 2011, by Roulland et al., entitled "MOBILE SCREEN METHODS AND SYSTEMS FOR COLLABORATIVE TROUBLESHOOTING OF A DEVICE," are both incorporated herein by reference in their entirety.

BACKGROUND

The present disclosure relates to diagnostic and customer-service systems for users of office equipment, such as copiers, printers, facsimile, and multifunction devices.

Office equipment, such as printers or copiers, typically uses a software-based operating system to perform essential machine functions and implement the various jobs of which the machine is capable. However, software, particularly that used in high-speed multifunction machines, is subject to various problems and faults. Additional problems also arise with the machine hardware which, in machines of this type, is extremely complex and sophisticated. Hardware and software problems that occur typically happen at a low, non-periodic rate and thus are very difficult to replicate when servicing the machine and therefore difficult to resolve. Further, many of these problems are identified by the customer, who is typically not technically trained to diagnose and service machines of this type. For this reason, it is important for a servicing organization to be able to access key machine operating information, and particularly information reflecting on the performance of the machine control system and physical states of machine componentry.

A common feature of the business arrangement between the user of the equipment and the supplier is that the user is responsible, at least in part, for some maintenance and basic trouble-shooting of the equipment. Often the equipment has componentry that can be tested, manipulated and perhaps replaced by the user, but in view of the investment in the equipment, users are reluctant to engage in system repair without the strong support of the supplier and its service departments. Accordingly, enhancing the accuracy and efficiency of equipment service is based on particularly articulating or determining equipment status and the occurring problem to a remote trouble-shooting service department. Frustrating experiences with the telephone communication-to-tech support departments is universally known and the problems with unsophisticated customers trying to actually communicate a problem to the department are extremely common.

Typically, when a user encounters a problem with a machine and cannot resolve it (or does not want to solve it himself), he (or a user representative) calls a support organization for assistance; such organizations typically have troubleshooters available to help. After salient details such as the machine serial number have been taken, the troubleshooter tries to ascertain the character and extent of the problem. When the nature of the problem and its possible causes have been uncovered, the troubleshooter will either propose some ways to attempt to resolve the problem or decide at this point that the call is best passed to higher level support. Where the troubleshooter attempts to get the user to resolve the problem, aside from his own knowledge and experience he may make use of a range of resources, such as an online knowledge base, physical machines, or the advice of colleagues.

The interactions between a user experiencing a problem with a machine and a troubleshooter on the phone recurrently involve a number of phenomena. The user and the troubleshooter between them build up a description of the problem that enables consideration of what an appropriate solution might be. This can include:

the provision by the user of an initial problem description, often containing a range of contextual information about the situation the problem has arisen in;

the reformulation of this description by the troubleshooter, into terms more specifically relevant to locating a solution;

affirmation/refinement of this description by the user;

potential further joint refinement of the problem/collation of other relevant features (either verbally or by getting the user to 'go look'); and, working together through instruction, implementation, and feedback to try out possible solutions.

In doing this work both the user and the troubleshooter routinely describe physical elements of the machine and give spatial directions or descriptions. It is often necessary to describe machine parts because users do not necessarily have the technical vocabulary to identify machine parts by name. The situation in which this particular problem with this particular machine arose has to be made available, where either party may only have partial information. The full extent of the problem also needs to be inquired into and made available. This may involve asking the user to undertake additional testing activities and report back. Potential solutions must be located and instructions given, followed, and their outcomes provided.

These interactions also typically take place under circumstances where the interactants only have access to an audio channel (telephone) which is not necessarily (physically) located by the machine, thereby requiring the user to negotiate a means of accessing the machine while retaining contact with the troubleshooter. The audio channel alone means that all descriptions, instructions and feedback are only verbal and the user will be the sole source of the initial problem description, circumstantial information, the results of the attempted instructions, etc. This can result in the troubleshooter requesting that the user repeat actions, either because they do not know the user has already done these, or because they cannot be sure the user has done these correctly. For the troubleshooter, where possible solutions come from textual resources, they will have to be digested from text and then articulated through purely verbal means. As a consequence of these circumstances a number of issues arise where the resolution is, at best, sub-optimal:

The user may lack access to the machine while on the phone and need to devote effort to coordinating access with others or constantly moving between the phone and the machine.

Troubleshooters will lack potentially significant and relevant information about the current machine status, the previous actions undertaken by the user, and the machine's previous behavior.

There is a lack of mutual access to the machine resulting in effort being devoted to:

describing the current state and answering questions in order to arrive at a mutually agreed expression of the problem;

producing instructions and directions and reporting back without being able to see how instructions and directions might be appropriately framed to the current circumstance (necessitating potentially redundant feedback and varying degrees of clarification); and working out ways together to ensure that they are referring to the same physical components of the machine.

Out of these observations it is possible to recognize two inter-related and potentially critical barriers to fully effective troubleshooting via conventional means:

1. The site of the problem is removed from the site of resolution for user-machine interactions. Excessive physical movement and coordination may be demanded, there is an absence of potentially important information to relevant parties, and both the problem and the resolution must always be mediated by verbal means.

2. The user-troubleshooter interaction is not best facilitated solely over the phone. Restriction to verbal mediation only diminishes the capacity to recognize the current state of the machine, the user situation, the object of reference, and the import of instructions.

The foregoing problems have suggested various needs for improved collaborative, distributed troubleshooting of network devices such as printers or MFDs ("multifunction devices"). There is a need for the improved communication of important information to be accomplished by the use of networking and user interface ("UI") capabilities with the equipment to handle the collaboration between the user and troubleshooter, and to use sensors and actuators (LEDs in the equipment).

For printing devices that do not have rich user interfaces, fault clearance instructions or other device specific information is only available via documentation. Traditionally, this documentation has been printed or available electronically through web sites or other digital media. This documentation is typically static and in some cases can become out of date even before the device is publically available. Moreover, this documentation is typically not accessible when and where it is most needed at the device when there are issues.

BRIEF DESCRIPTION

In one embodiment of this disclosure, described is a method of operating a communication system to provide service related information to a user of a device operatively isolated from the communication system, the communication system including a mobile phone operatively connected to a server, and the method comprising a) a user initiating communications between the mobile phone and the server; b) the server communicating user instructions to the mobile phone, and the mobile phone communicating the user instructions from the server to the user using a UI (User Interface) associated with the mobile phone, the user instructions related to the mobile phone obtaining device information and the user instructions including one or more of (1) the user capturing an one or more images of the device with the mobile phone to obtain the device information, (2) the user textually entering information about the device into the mobile phone, and (3) the user verbally speaking information about the device into the mobile phone; c) the mobile phone communicating the device information to the server; d) the server processing the device information and retrieving service related information relevant to the device information; e) the server communicating the service related information to the mobile phone; and f) the mobile phone communicating the service related information to the user using the UI associated with the mobile phone.

In another embodiment of this disclosure, described is a communication system to provide service related information to a user of a device operatively isolated from the communication system, the communication system comprising a mobile phone; and a server operatively connected to the mobile phone, the server configured to access and execute computer readable instruction to perform a method of providing service related information to a user, the method comprising a) a user initiating communications between the mobile phone and the server; b) the server communicating user instructions to the mobile phone, and the mobile phone communicating the user instructions from the server to the user using a UI (User Interface) associated with the mobile phone, the user instructions related to the mobile phone obtaining device information and the user instructions including one or more of (1) the user capturing an one or more images of the device with the mobile phone to obtain the device information, (2) the user textually entering information about the device into the mobile phone, and (3) the user verbally speaking information about the device into the mobile phone; c) the mobile phone communicating the device information to the server; d) the server processing the device information and retrieving service related information relevant to the device information; e) the server communicating the service related information to the mobile phone; and f) the mobile phone communicating the service related information to the user using the UI associated with the mobile phone.

In still another embodiment of this disclosure, described is a method of operating a communication system to provide service related information to a user of a device operatively isolated from the communication system, the communication system including a mobile phone operatively connected to a Device Assist Service process running on a server, and the method comprising a) the user initiating communications between the mobile phone and the Device Assist Service; b) the Device Assist Service communicating voice prompts to the user via the mobile phone, the voice prompts instructing the user to take one or more specific pictures of the device; c) the mobile phone communicating to the Device Assist Service the one or more specific pictures of the device; d) the Device Assist Service communicating visual and audio data to the mobile phone, the visual and audio data including one or more of an image of the device, a model name and account information; e) the Device Assist Service communicating one of video and audio data to the mobile phone requesting confirmation from the user of the visual and audio data communicated in step d); and f) the Device Assist Service communicating additional service information to the mobile phone if the Device Assist Service receives a confirmation from the user, and the Device Assist Service returning to step b) if the Device Assist Service does not receive the confirmation from the user.

DETAILED DESCRIPTION

This disclosure provides methods and systems for delivering device specific service documentation to a mobile platform, such as, but not limited to, a smart phone. The mobile phone platform can provide several pieces of information including images of the devices, its serial number, its error condition along with voice input, and location as directed by the host application The results providing service information about the device are returned by voice and documentation.

Mobile devices with cameras have become ubiquitous. These devices provide a point of need capability to provide documentation to a user of a device, such as a printer. By utilizing the camera and image recognition technology, a picture is taken of a device and relevant documentation is delivered to the device on demand. Depending on the image captured, the delivered content can be generic or specific. For example, capture of information on the printer display can deliver relevant fault clearing instructions.

This disclosure provided a way to utilize a mobile device, such as a SmartPhone, to provide point of need fault clearance or other instructions at a device that lacks a sophisticated user interface to display the instructions. The first step in the process is to identify the device that is having the problem, then to recognize the problem and, finally, to provide instructions to the user via the mobile device.

The capabilities of the SmartPhone are leveraged and may include:

(1) The camera to take pictures that will help identify the device and the condition, (2) Voice input and output which can be used to provide device details and to audibly provide information back to the user, (3) The network or phone line connection to transmit the information to a service that will analyze the data and provide visual and audible instructions, (4) The UI to display a visual image (5) The phones GPS coordinates may also provide useful information.

The user scenario and work flow are as follows:

A user is printing a document and the machine shuts down with an error code. (Note: this disclosure is not limited to printing devices). There is no up to date documentation available to reference.

The user takes out his SmartPhone and connects to a Device Assist Service which leads him through the process of gathering information, both verbally and by use of the camera. He may take pictures of the device profile (view), possibly the serial number plate or model plate, and the UI or other area that shows the problem. He can also use voice to input some of the information, for example, he can read the serial number if it is not easy to photograph.

The Device Assist Service will use this input to determine the model number of the device. Photo recognition software is available that can identify specific device models. The serial number can be used to determine if the device is under contract.

The Service would then send images, augmented with voice, to the SmartPhone with instructions. If the problem requires a service call, it can schedule one based on service contacts identified by the serial number.

The novelty of this disclosure is in the use of SmartPhone capabilities to:

Identify the device with the problem by using image recognition software and voice input; and To provide point of need information using the display and voice output capability of the phone.

This disclosed method is ideal for getting help on devices that do not have sophisticated displays to provide instructions. The SmartPhone can provide the UI and the Service can get the latest instructions, which may not have been available at the time the paper documentation was created. Another very big advantage is that the method and system disclosed does not require any changes to the device requiring service so it can be used with older machines that are in the field (MIF—Machines in Field). In the event that a service call is required, this method can provide valuable information so that the service provider brings the correct parts on the call.

This disclosed method and system can be applied to almost any device by any manufacturer—appliances, automobiles, etc. It can be used to provide installation instructions for people making repairs. For example, if a person needs to repair a leaking door on a washing machine. The pictures can lead them to the correct part to purchase, order of the part or placement of a service call, and then a video of the assembly procedure.

Figure 1:
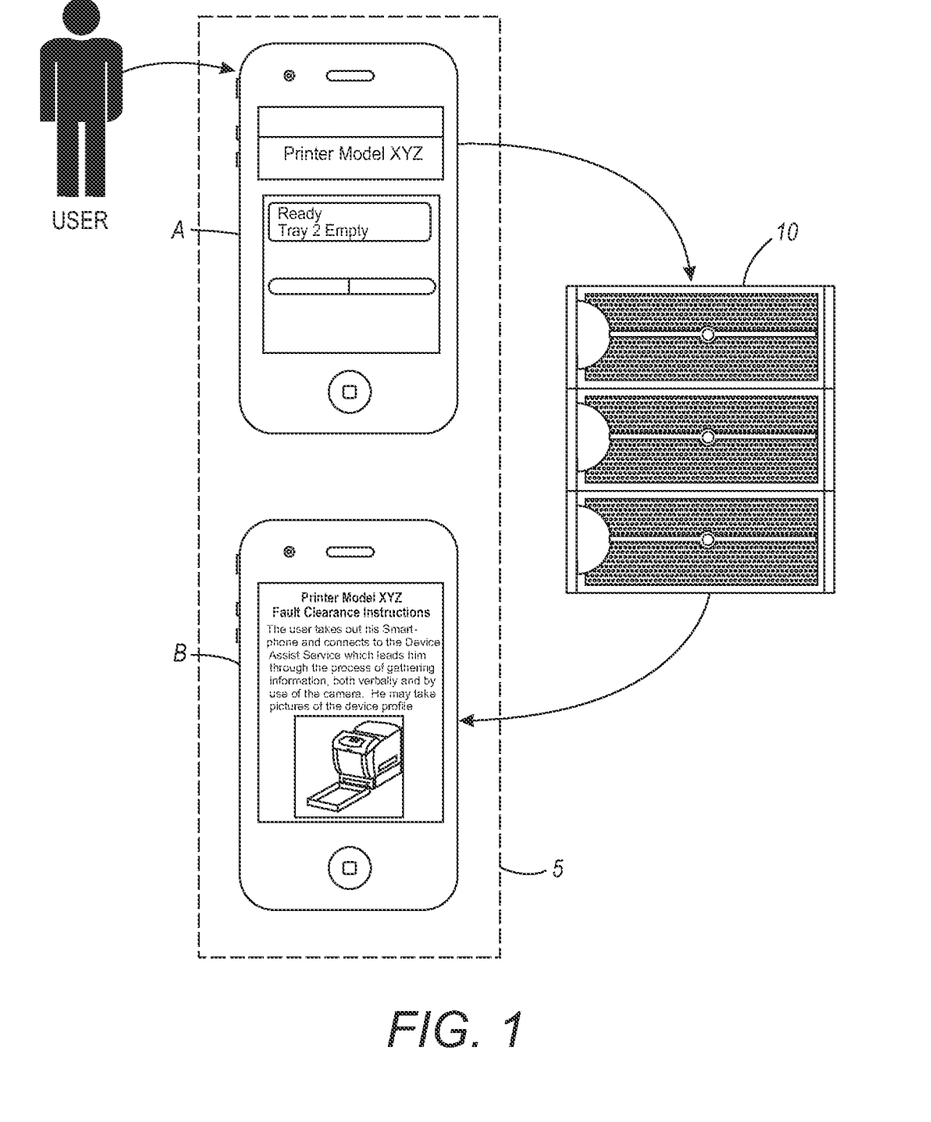
FIG. 1 is a schematical representation of an exemplary embodiment of a communication system for providing service related information to a user of a device.

With reference to FIG. 1, illustrated is an exemplary embodiment of a communication system to provide service related information to a user of a device.

The system includes a mobile device 5 and one or more Device Assist Servers 10 which can be operatively connected to the mobile device. Notably, the relevant device to be serviced is not shown and is operatively isolated from the communication system. In other words, the relevant device to be serviced cannot communicate with the Device Assist Server.

The system operates as follows:

(1) Initially, a user of the device initiates communications with the Device Assist Server utilizing the mobile communication device.

(2) Following instructions, either visually and/or audibly communicated to the mobile communication devices, from the Device Assist Server 10, the user captures the relevant device information (A) via a camera associated with the mobile communication device or the user provides textual/verbal information to the mobile communication device which is then communicated to the Device Assist Server.

(3) The information provided by the user in step (2) is then processed by the Device Assist Server utilizing image/voice recognition software to determine one or more of serial number of the device, model of the device, location of the device, fault/error associated with the device, etc.

Based on the attributes associated with the device, the relevant service related information (b) is communicated to the mobile communication device for viewing/listening by the user.

Figure 2:
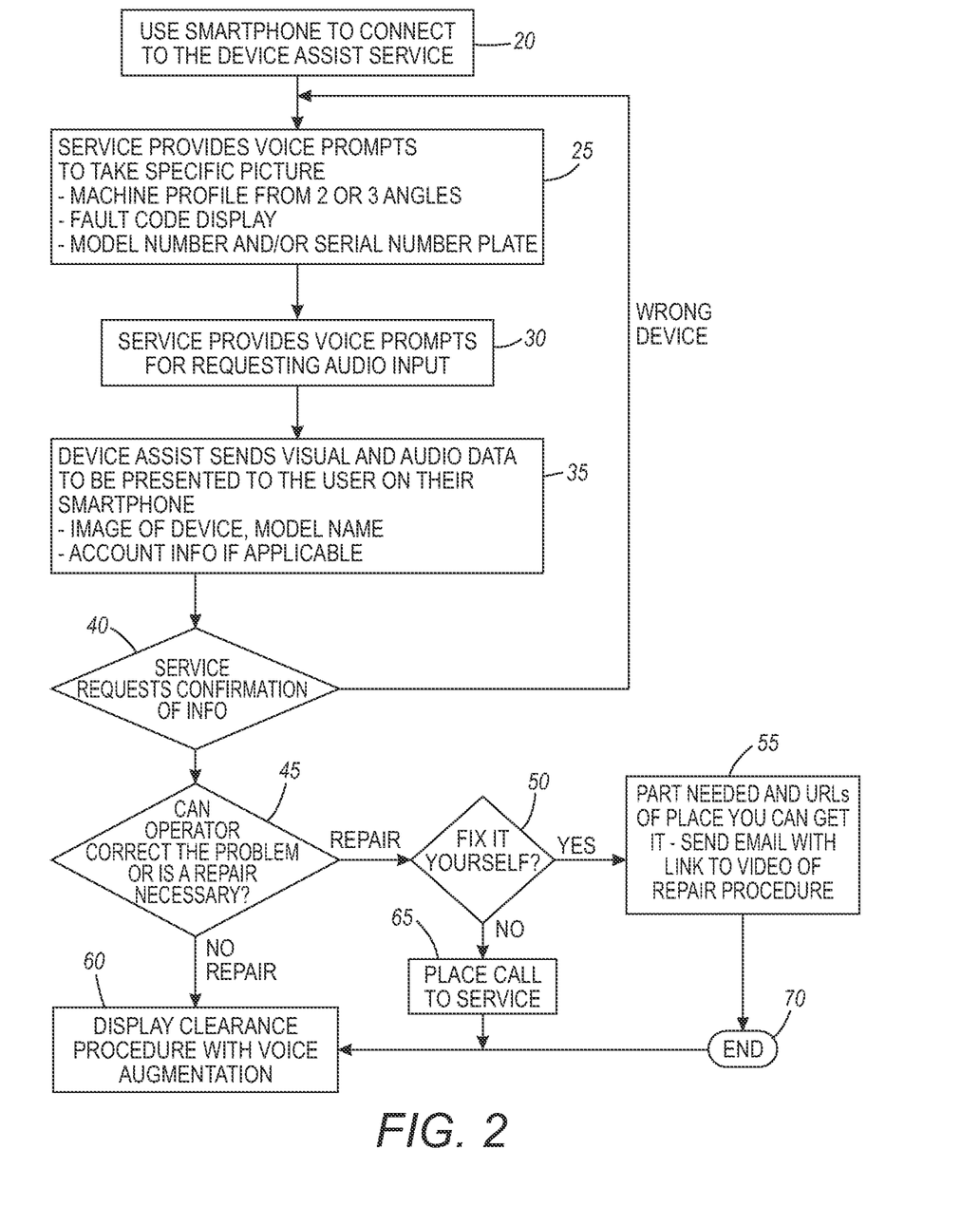
FIG. 2 is a flow chart of an exemplary embodiment of a method of operating a communication system as illustrated in FIG. 1.

With reference to FIG. 2, illustrated is one example of an exemplary embodiment of a method of operating a communication system to provide service related information to a user as disclosed herein.

Initially 20, a user uses a smartphone to connect to the Device Assist Service.

Next 25, the Device Assist Service provides voice prompts to take specific pictures. For example, one or more machine profile images, fault code display image, model number and/or serial number plate image.

Next 30, optionally, the Device Assist Service provides voice prompts for requesting audio input from the user.

Next 35 and 40, the Device Assist Service communicates to the SmartPhone visual and/or audio data to be presented to the User for confirmation, including an image of the device, model name, account information, etc.

In the event the user does not confirm the device information provided by the Device Assist Service, the Device Assist Service returns to step 25 to obtain the relevant device information again.

Next 40, after the user confirms the device information, the Device Assist Service determines whether the operator can fix the problem or is a repair necessary by a qualified service technician.

In the event the problem can be cleared up by the user, the Device Assist Service communicates 60 a clearance procedure to the user. The procedure is displayed on the SmartPhone and may include voice augmentation.

At this point, the Device Assist Service ends 70.

In the event the operator/user can not correct the problem, processes 50 queries the user to determine if the user desires to repair the device or desires the Device Assist Service to place a service call 65.

If the user desires to repair the device, step 55 communicates to the SmartPhone the part(s) needed, as well as URLs of places to order the parts. In addition, further information is provided to the SmartPhone to instruct the user how to make the repair. This may include an email and/or a link to video of the relevant repair procedure.

After a service call is placed by the Device Assist Service or the Repair Instructions are communicated to the SmartPhone, the Device Assist Service process ends 70.

Figure 3:
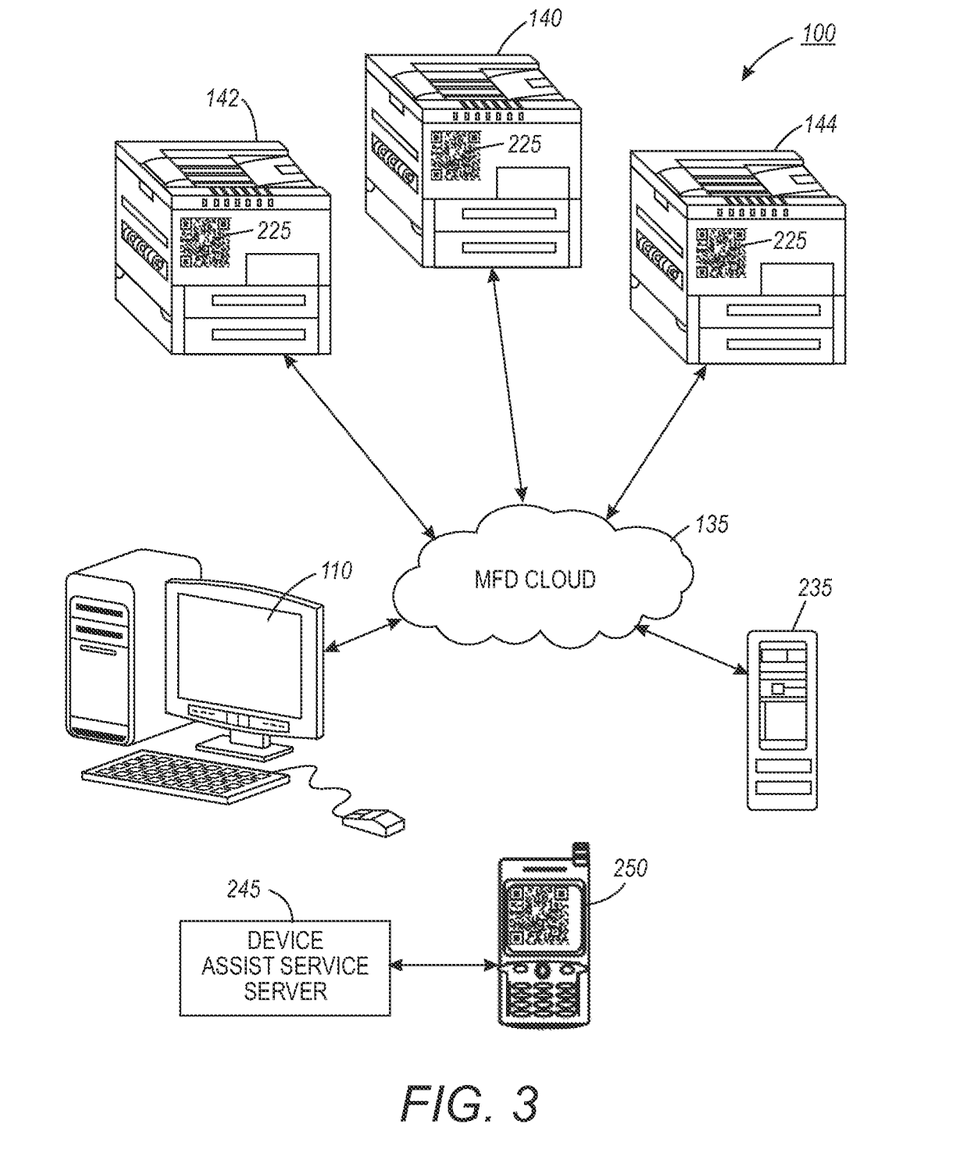
FIG. 3 is a block diagram of an exemplary embodiment of a rendering system including a communication system for providing service related information to a user of one or more of the illustrated rendering devices.
Figure 4:
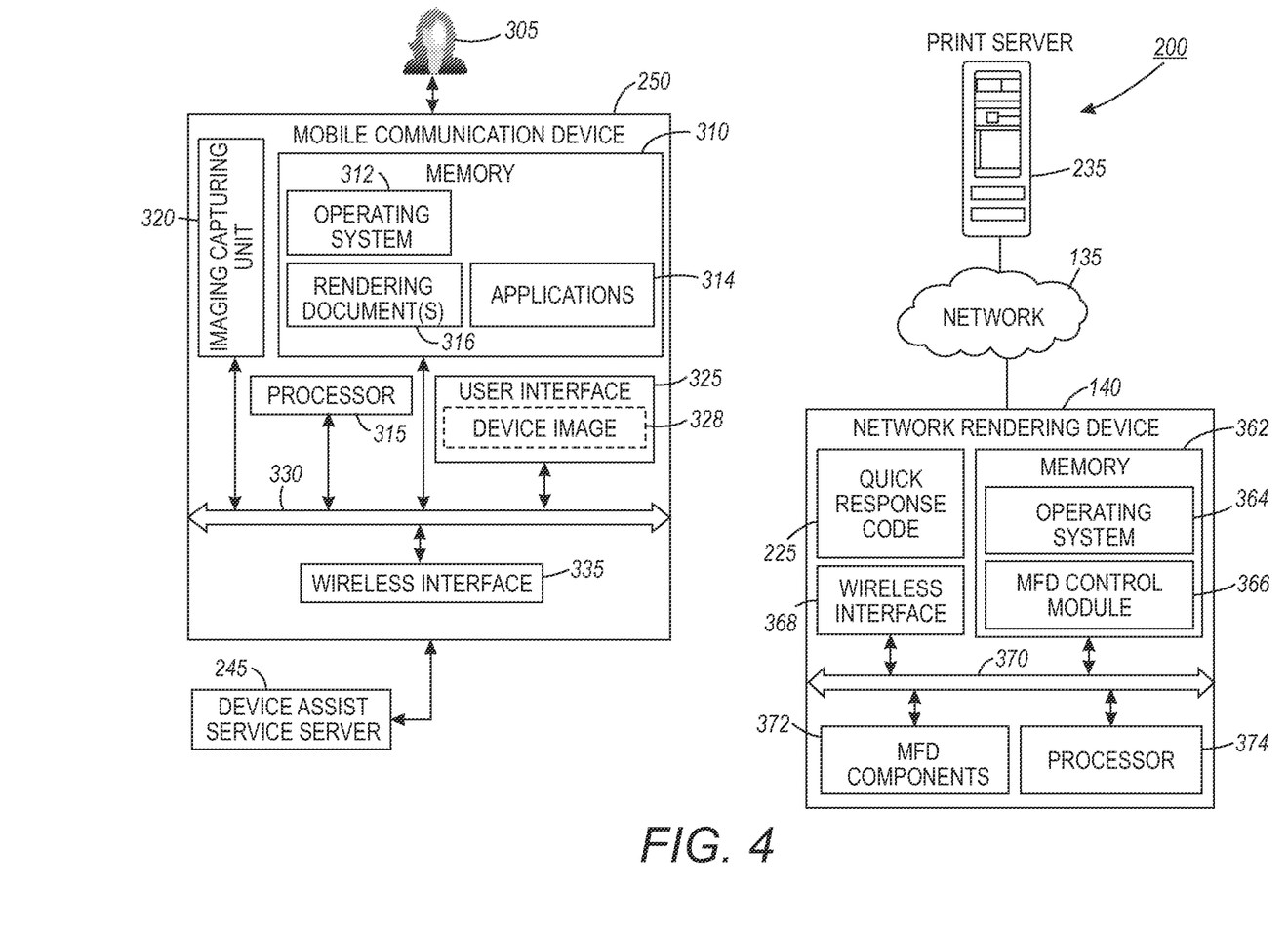
FIG. 4 is a block diagram of another exemplary embodiment of a rendering system including a communication system for providing service related information to a user of one or more of the illustrated rendering devices

FIG. 3 illustrates a graphical representation of a communication system 100 associated with a network 135, in accordance with the disclosed embodiments. The communication system 200 generally includes a network infrastructure 135 associated with one or more networked rendering devices 140, 142 and 144, data-processing system 110, a mobile communication device 250, a server 235 and a Device Assist Service Server. Data-processing system 110 can be, for example, a server. Other devices such as, for example, desktops, network devices, palmtops, mobile phones, etc. may also be included in the network 135, as service providers. The rendering devices 140, 142 and 144 can be located remotely with respect to each other, or alternatively, they may be located locally with respect to each other.

The rendering device is an office machine which incorporates the functionality of multiple devices in one, so as to provide centralized document management, document distribution and production in a large-office setting and the like. The typical rendering device may act as a combination of a printer, scanner, photocopier, fax and e-mail. While three rendering devices 140, 142 and 144 are shown by way of example, it is to be appreciated that any number of rendering devices may be linked to the network, such as four, six or more rendering devices. In general, the rendering devices 140, 142 and 144 can be employed to perform a rendering output function (e.g., printing, scanning, copying, faxing, etc.) within a networked environment. Note that rendering devices 140, 142 and 144 are generally analogous to one another.

The rendering device 140, 142 and 144 can be configured in association with a two-dimensional bar code 225 that includes information (e.g. address details, service information, etc.) with respect to the rendering device 140, 142 and 144. A Device Assist Service module 245 operatively connectable to the mobile communication device 250 can be adapted for diagnosing and fixing a fault associated with the networked rendering device 140, 142 and 144. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, this disclosure generally refers to such software modules or implementations thereof. The methodology described herein can be implemented as a series of such modules or as a single software module. Such modules can be utilized separately or together to form a program product that can be implemented through signal-bearing media, including transmission media and recordable media. The disclosed embodiments are also capable of being distributed as a program product in a variety of forms, which apply equally regardless of the particular type of signal-bearing media utilized to carry out the distribution.

Examples of signal-bearing media can include, for example, recordable-type media, such as USB drives, Flash drives, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

FIG. 3 illustrates a block diagram of the communication system 200 for providing service related information to a user of rendering device 140, in accordance with the disclosed embodiments. The communication system 200 generally includes mobile communication device 250, the networked rendering device 140, and a printer server 235 operatively configured in association with the network 135. The system 200 can be employed for diagnosing and fixing faults in the rendering device 140 by displaying an image on the mobile communication device with service related information based on information provided by a user of the mobile communication device 250.

The mobile communication device 250 can be such as, for example, a SmartPhone, a personal digital assistant (PDA), and the like. The mobile communication device 250 includes an image capturing unit 320, a memory 310, a processor 315 and the user interface 325 coupled to a local interface 330. The image-capturing unit 320 may be generally employed to capture optical images such as pages of documents, handwritten messages, hand-sketched drawings and other type of image related information. The image-capturing unit 320 may include built-in integrated functions such as image processing, data formatting and data compression functions. Also, the unit 320 includes imager-positioning and range-finding capabilities and a flash bulb. The local interface 330 can be for example, a data bus with an accompanying control/address bus.

A wireless interface 335 facilitates wireless communication with a device Assist Service Server and possibly other wireless devices and/or networks. The memory 310 stores several components that are executable by the processor 315.

The components include, for example, an operating system 312, one or more applications 314, and one or more rendering documents 316.

The networked rendering device 140 includes a processor circuit having a memory 362 and a processor 374 coupled to a local interface 370. The memory 362 stores an operating system 364 and a print control module 366 that are executable by the processor 374. The networked rendering device 140 also includes various printer components 372 such as motors and mechanical paper path components as well as image creation components. A wireless network interface 368 coupled to the local interface 370 facilitates wireless communication in the networked rendering device 140. The two-dimensional barcode 225 associated with the networked rendering device 140 can be attached as a hard copy image or displayed on a user interface of the rendering device 140.

Optionally, a two-dimensional barcode 225 can be, for example, a quick response (QR) code, depending upon design considerations. Note that the two-dimensional code 225 can be a machine-readable code utilizing either a public standard encoding symbol or a proprietary symbol. The two-dimensional code 225 generally includes varying positioning symbols, apex detecting cells, information recording regions, timing cell regions and format code regions. The two-dimensional code 225 includes address information, blog/website information, email address, service information or any other normal text with respect to the networked rendering device 140. Such information can be encoded and stored as numeric, alphanumeric, binary (8 bits) (or) Kanji/full-width Kana characters.

The mobile communication device 250 can be used to read the two-dimensional bar code 225 associated with the rendering device 140 via the image capturing unit 320. The IP (Internet Protocol) address of the rendering device 140 can also be entered on the mobile communication device 250 to provide additional information to the Device Assist Service. An image 328 with respect to the rendering device 140 can be captured by the image-capturing unit 320 associated with the mobile communication device 250. Action instructions to be taken with respect to a specific area 326 of the rendering device can be displayed on the mobile communication device 250. The system 200 provides increased customer satisfaction through the analysis of video and improvements brought about by the video.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A communication system to provide service related information to a user of a device operatively isolated from the communication system, the communication system comprising:
   a mobile phone operatively isolated from receiving data communications directly from the device; and
   a server operatively associated with a Device Assist Service process, the server operatively connected to the mobile phone, the server and the mobile phone configured to access and execute computer readable instruction to perform a method of operating the communication system to provide service related information to the user, the method comprising:
   a) the user initiating communications between the mobile phone and the Device Assist Service;
   b) the Device Assist Service communicating voice prompts to the user via the mobile phone, the voice prompts instructing the user to take one or more specific pictures of the device;
   c) the mobile phone communicating to the Device Assist Service the one or more specific pictures of the device;
   d) the Device Assist Service communicating visual and audio data to the mobile phone, the visual and audio data including one or more of an image of the device, a model name and account information; and
   e) the Device Assist Service communicating one of video and audio data to the mobile phone requesting confirmation from the user of the visual and audio data communicated in step d).

2. The communication system according to claim 1, the device information including one or more of a serial number of the device, a model number of the device, a fault condition associated with the device, a physical location associated with the device, and a physical profile of the device.

3. The communication system according to claim 1, the service related information including one or more of voice prompts requesting audio input from the user for additional information related to the device, text prompts requesting textual input from the user for additional information related to the device, an image of the device, the model of the device, the serial number of the device, account information, service confirmation information, fault clearance instructions, repair instructions, part information, URLs of places to get part, and a link to video of a repair procedure for the device.

4. The communication system according to claim 1, wherein a UI associated with the mobile phone including includes one or more of a visual display, an audible system, a key pad and a camera.

5. The communication system according to claim 1, wherein the device is one of a printer, a MFD (Multifunction Device), and an image scanner.

6. The communication system according to claim 1, step b) comprising the user capturing two or more images of the device, the two or more images captured from different perspectives of the device.

7. The communication system according to claim 1, wherein steps bye), are repeated one or more times.

8. The communication system according to claim 1, wherein:
   a UI associated with the mobile phone including includes a visual display, an audible system, a keypad and a camera; and
   the device is a printer.

9. A method of operating a communication system to provide service related information to a user of a device operatively isolated from the communication system, the communication system including a mobile phone operatively connected to a Device Assist Service process running on a server, and the method comprising:
   a) the user initiating communications between the mobile phone and the Device Assist Service;
   b) the Device Assist Service communicating voice prompts to the user via the mobile phone, the voice prompts instructing the user to take one or more specific pictures of the device;
   c) the mobile phone communicating to the Device Assist Service the one or more specific pictures of the device;
   d) the Device Assist Service communicating visual and audio data to the mobile phone, the visual and audio data including one or more of an image of the device, a model name and account information;

e) the Device Assist Service communicating one of video and audio data to the mobile phone requesting confirmation from the user of the visual and audio data communicated in step d); and f) the Device Assist Service communicating additional service information to the mobile phone if the Device Assist Service receives a confirmation from the user, and the Device Assist Service returning to step b) if the Device Assist Service does not receive the confirmation from the user.

10. The method of operating a communication system according to claim 9, wherein the additional service information is one of a fault clearance procedure, a repair procedure, part replacement information and a web link to video of a repair procedure.

11. The method of operating a communication system according to claim 9, further comprising:

g) the Device Assist Service communicating to the mobile phone a request for the user to indicate one of audibly and textually whether a service call is required.

12. The method of operating a communication system according to claim 9, further comprising:

g) the user confirming one or more items of service related information communicated from the server.

13. A method of operating a communication system to provide service related information to a user of a device operatively isolated from the communication system, the communication system including a mobile phone operatively connected to a Device Assist Service process running on a server, and the method comprising:

a) the user initiating communications between the mobile phone and the Device Assist Service;

b) the Device Assist Service communicating voice prompts to the user via the mobile phone, the voice prompts instructing the user to take one or more specific pictures of the device;

c) the mobile phone communicating to the Device Assist Service the one or more specific pictures of the device;

d) the Device Assist Service communicating visual and audio data to the mobile phone, the visual and audio data including one or more of an image of the device, a model name and account information; and e) the Device Assist Service communicating one of video and audio data to the mobile phone requesting confirmation from the user of the visual and audio data communicated in step d).

14. The method of operating a communication system according to claim 13, the device information including one or more of a serial number of the device, a model number of the device, a fault condition associated with the device, a physical location associated with the device, and a physical profile of the device.

15. The method of operating a communication system according to claim 13, the service related information including one or more of voice prompts requesting audio input from the user for additional information related to the device, text prompts requesting textual input from the user for additional information related to the device, an image of the device, the model of the device, the serial number of the device, account information, service confirmation information, fault clearance instructions, repair instructions, part information, URLs of places to get part, and a link to video of a repair procedure for the device.

16. The method of operating a communication system according to claim 13, wherein a UI is associated with the mobile phone including includes one or more of a visual display, an audible system, a key pad and a camera.

17. The method of operating a communication system according to claim 13, wherein the device is one of a printer, a MFD (Multifunction Device), and an image scanner.

18. The method of operating a communication system according to claim 13, step b) comprising the user capturing two or more images of the device, the two or more images captured from different perspectives of the device.

19. The method of operating a communication system according to claim 13, wherein steps b)-e) are repeated one or more times.

20. The method of operating a communication system according to claim 13, wherein:

a UI is associated with the mobile phone including a visual display, an audible system, a keypad and a camera; and the device is a printer.

21. The method of operating a communication system according to claim 13, the Device Assist Service communicating additional information to the mobile phone wherein the additional service information is one of a fault clearance procedure, a repair procedure, part replacement information and a web link to video of a repair procedure.

22. The method of operating a communication system according to claim 13, further comprising:

f) the Device Assist Service communicating to the mobile phone a request for the user to indicate one of audibly and textually whether a service call is required.

* * * * *